United States Patent
Mertz et al.

(10) Patent No.: US 9,154,258 B1
(45) Date of Patent: Oct. 6, 2015

(54) SUBSEA OPTICAL COMMUNICATION SYSTEM DUAL POLARIZATION IDLER

(71) Applicant: Infinera Corp., Annapolis Junction, MD (US)

(72) Inventors: Pierre Mertz, Baltimore, MD (US); Hai Xu, N. Laurel, MD (US)

(73) Assignee: Infinera Corporation, Sunnyvale, CA (US)

( * ) Notice: Subject to any disclaimer, the term of this patent is extended or adjusted under 35 U.S.C. 154(b) by 4 days.

(21) Appl. No.: 14/230,595

(22) Filed: Mar. 31, 2014

(51) Int. Cl.
  *H04B 10/00* (2013.01)
  *H04J 14/06* (2006.01)
  *H04B 10/80* (2013.01)

(52) U.S. Cl.
  CPC .............. *H04J 14/06* (2013.01); *H04B 10/80* (2013.01)

(58) Field of Classification Search
  CPC ................................. H04B 10/80; H04J 14/06
  USPC .................................................. 398/104, 105
  See application file for complete search history.

(56) References Cited

U.S. PATENT DOCUMENTS

| | | | |
|---|---|---|---|
| 6,999,683 B2* | 2/2006 | Kerfoot et al. | 398/85 |
| 7,120,362 B2* | 10/2006 | Pedersen et al. | 398/104 |
| 2014/0363166 A1* | 12/2014 | Lacovara | 398/104 |
| 2015/0098705 A1* | 4/2015 | Motley | 398/104 |

* cited by examiner

*Primary Examiner* — M. R. Sedighian
(74) *Attorney, Agent, or Firm* — Dunlap Codding PC; David L. Soltz

(57) ABSTRACT

Systems and methods are disclosed including a subsea link idler apparatus comprising at least one data laser generating a first laser beam as a data signal, having a first frequency within a first data channel bandwidth slot; a first continuous wave laser generating a second laser beam with a first polarization and a second frequency being within a second data channel bandwidth slot; a second continuous wave laser generating a third laser beam with a second polarization different from the first polarization and a third frequency being offset from the second frequency and being within the second data channel bandwidth slot; a polarization beam combiner positioned in paths of the second and third laser beams combining the second and third laser beams into an idler signal; and a transmitter receiving and transmitting the data signal and idler signal.

20 Claims, 9 Drawing Sheets

SUBSEA OPTICAL COMMUNICATION SYSTEM DUAL POLARIZATION IDLER

FIELD OF THE DISCLOSURE

The disclosure generally relates to methods and apparatuses for managing coherent channels' optical power in subsea communication systems. More particularly the disclosure relates to, but is not limited to, systems for creating and using optical signals composed of multiple continuous wave polarized lasers combined with a polarization beam combiner in order to lower the optical channel's optical power, for example, in polarization multiplexed subsea optical communication systems that may be designed for higher optical constant power legacy channels.

BACKGROUND

Generally, subsea optical communication systems communicate over long distances by operating at constant optical power. The designed power of a data channel in the system is the total constant power (in dBm or milliwatts) divided by the number of data channels that can fit within the repeater bandwidth of the subsea communication line. When the system is not fully populated with data channels, such as during early installations or during upgrades where fewer higher capacity channels can replace many legacy channels, the power per channel of those fewer channels will be higher than the designed optimal power. In contrast, terrestrial communication lines generally use constant gain amps, that is, as channels are added power is added such that the power is the same for each channel.

Subsea communication systems were designed originally for a format running at higher power levels than needed or desired by current systems. Typically, in order to operate a desired number of data-carrying channels at a desired power level in subsea communication systems, idlers (also known as dummy lasers) create idler signals for transmission in non-data carrying channels to soak up the excess power, that is, to use the unwanted milliwatts. The idler channels do not carry data and are used as filler to maintain the desired power level of the data-carrying channels. If additional data-carrying channels are desired, the data channels can replace or lower the power of one or more idler channels.

Examples of current idlers include spectrally filtered amplified spontaneous emission (ASE) devices and single polarization continuous wave (CW) lasers. In current subsea communication systems, however, current idlers cause problems with the transmission of data in the channels. ASE and CW idlers cause degradation of quality of the data optical signals in the data channels. For example, since ASE idlers are noise based, the amplitude noise can impart a nonlinear penalty to the data channels through cross-phase modulation (XPM). Since current CW laser idlers are singly polarized sources, the singly polarized CW laser idlers can create linear and nonlinear penalties to the polarization multiplexed data channels phase modulated signals through polarization dynamic gain (PDG) known as "hole burning" and cross-polarization modulation (XPoIM) non-linearity issues.

SUMMARY

Methods and systems are disclosed that manage the power levels and enhance the quality of data signals in long range optical transmission systems, such as subsea communication systems, by use of one or more dual polarization idler.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
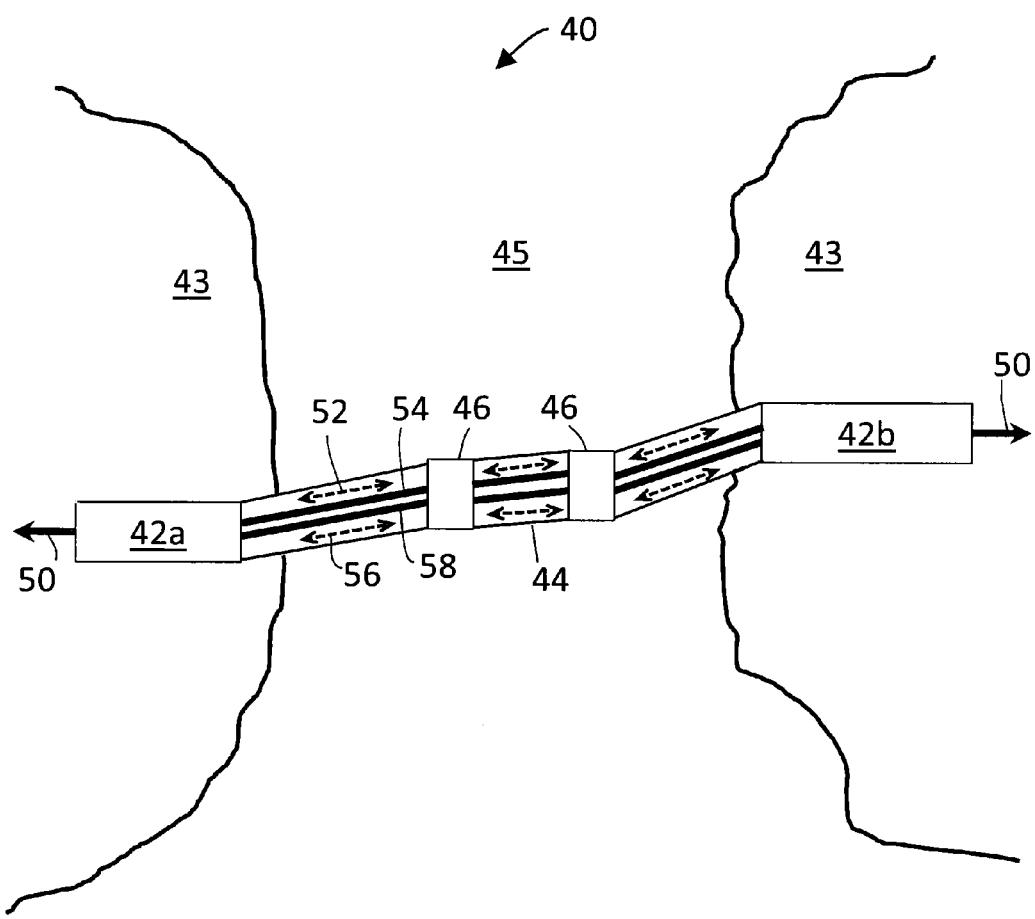
FIG. 1 is a block diagram of an exemplary subsea communication system.

The following detailed description refers to the accompanying drawings. The same reference numbers in different drawings may identify the same or similar elements.

The mechanisms proposed in this disclosure provide improved quality and reliability of optical data signals in subsea communication systems. Consistent with an aspect of the present disclosure, a subsea link idler apparatus may comprise at least one data laser generating at least one first laser beam as a data signal, the first laser beam having a first frequency being within a first data channel bandwidth slot; a first continuous wave laser generating a second laser beam with a second frequency and a first polarization, the second frequency being within a second data channel bandwidth slot; a second continuous wave laser generating a third laser beam with a third frequency and a second polarization different from the first polarization, the third frequency being offset in frequency from the second frequency and being within the second data channel bandwidth slot; a polarization beam combiner positioned in paths of the second and third laser beams combining the second and third laser beams into an idler signal; and a transmitter amplifier receiving and transmitting the data and idler signals. The first frequency may be tuned to a center channel frequency of a plurality of data channel frequencies.

Consistent with an aspect of the present disclosure, the third frequency may be separated from the second frequency by a frequency range of five to twenty GHz. In one embodiment, the third frequency may be separated from the second frequency by a frequency range of twelve GHz.

Consistent with an aspect of the present disclosure, a method may comprise generating with a data laser a first laser beam as a data signal, the first laser beam having a first frequency being within a first data channel bandwidth slot; generating with a first continuous wave laser a second laser beam with a second frequency and a first polarization, the second frequency being within a second data channel bandwidth slot; generating with a second continuous wave laser a third laser beam with a third frequency and a second polarization different from the first polarization, the third frequency being offset in frequency from the second frequency and being within the second data channel bandwidth slot; combining with a polarization beam combiner positioned in paths of the second and third laser beams, the second and third laser beams into an idler signal; and receiving and transmitting with a transmitter amplifier the data and idler signals. The third frequency may be separated from the second frequency by a frequency range of five to twenty GHz. The third frequency may be separated from the second frequency by a frequency of twelve GHz. The first frequency may be tuned to a nominal center channel frequency of a plurality of data channel frequencies.

Consistent with an aspect of the present invention, the idler signal may be a first idler signal, and the apparatus may further include a third continuous wave laser generating a fourth laser beam with a fourth frequency and a third polarization, the third frequency being within a third data channel bandwidth slot; and a fourth continuous wave laser generating a fifth laser beam with a fifth frequency and a fourth polarization different from the third polarization, the fifth frequency being offset in frequency from the fourth frequency and being within the third data channel bandwidth slot.

In one aspect of the present invention, the polarization beam combiner is adapted to combine the fourth and fifth laser beams into a second idler signal. In another aspect of the present invention, the polarization beam combiner is a first polarization beam combiner and the apparatus further includes a second polarization combiner positioned in paths of the fourth and fifth laser beams and adapted to combine the fourth and fifth laser beams into a second idler signal.

DEFINITIONS

If used throughout the description and the drawings, the following short terms have the following meanings unless otherwise stated:

IETF stands for Internet Engineering Task Force. The Internet Engineering Task Force (IETF) is a volunteer group dedicated to improving the Internet by proposing uniform standards for data transfer protocols, among other things. The IETF publishes Requests for Comment (RFC) detailing proposed standard protocols.

OTN stands for Optical Transport Network which includes a set of optical switch nodes which are connected by optical fiber links. ITU-T recommendations G.709 and G.872 define OTN interface requirements and network architecture respectively.

A super-channel, as used herein, may refer to multiple optical carriers that are simultaneously transported over the same optical waveguide (e.g., a single mode optical fiber). Each optical carrier included in a super-channel may be associated with a particular optical wavelength (or set of optical wavelengths). The multiple optical carriers may be combined to create a super-channel using wavelength division multiplexing. For example, the multiple optical carriers may be combined using dense wavelength division multiplexing, in which carrier-to-carrier spacing may be less than one nanometer. In some implementations, each optical carrier may be modulated to carry an optical signal.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" or "an aspect" means that a particular element, feature, structure, or characteristic described in connection with the embodiment or aspect is included in at least one embodiment or aspect. The appearances of the phrase "in one embodiment" or "in one aspect" in various places in the specification are not necessarily all referring to the same embodiment or aspect.

Referring now to the drawings, and in particular to FIG. 1, an exemplary subsea communication system 40 is illustrated therein. Subsea communication system 40 typically includes at least two terminal stations 42a, 42b on land 43 and at least one optical fiber submarine cable 44 extending underwater, such as on the ocean floor 45, between the two terminal stations 42a, 42b. The subsea communication system 40 may also include one or more repeaters 46 between the terminal stations 42a, 42b, which may, in part, boost signals in the optical fiber submarine cable 44. Not all subsea communication systems 40 utilize repeaters 46 and the present disclosure may apply to both repeater and repeaterless systems. Terminal stations 42a, 42b typically also provide transmission between the optical fiber submarine cable 44 and at least one terrestrial system 50.

Subsea communication systems 40 are well known to those having skill in the art and are further described by the International Telecommunication Union (ITU) in its recommendations and literature, such as the following: ITU-T G.971 "General features of optical fibre submarine cable systems," ITU-T G.972 "Definition of terms relevant to optical fibre submarine cable systems," ITU-T G.973 "Repeaterless submarine systems," ITU-T G.974 "Regenerative submarine systems," and ITU-T G.977 "Optically amplified submarine systems."

Subsea communication systems 40 typically utilize Wavelength Division Multiplexing (WDM) such as Dense Wavelength Division Multiplexing (DWDM). Dense Wavelength Division Multiplexing multiplexes multiple optical carrier signals, such as Optical Channel (OCh) signals or Super-Channel (SCh) signals, onto a single optical fiber by using different laser light wavelengths (colors).

In subsea communication systems 40, one or more optical data carrier signals 52 may be transmitted in one or more optical data channel 54 through the optical fiber submarine cable 44. As previously described, the subsea communications system 40 is in constant power in order to transmit for long distances with low noise. To be able to operate optical data channels 54 through the subsea communication system 40 at a lower power than the constant power, one or more idler signals 56 in one or more idler channel 58 may also be transmitted. The idler channels 58 are transmitted at different frequencies than the data channels 54. The idler channels 58 "soak up" the unwanted power not used by the data channels 54 so that the data channels 54 may operate at the correct power. For example, idler channels 58 may be used to lower the subsea communication system's 40 optical power in legacy subsea repeater systems which are designed for higher optical power 10G legacy channels.

Figure 2:
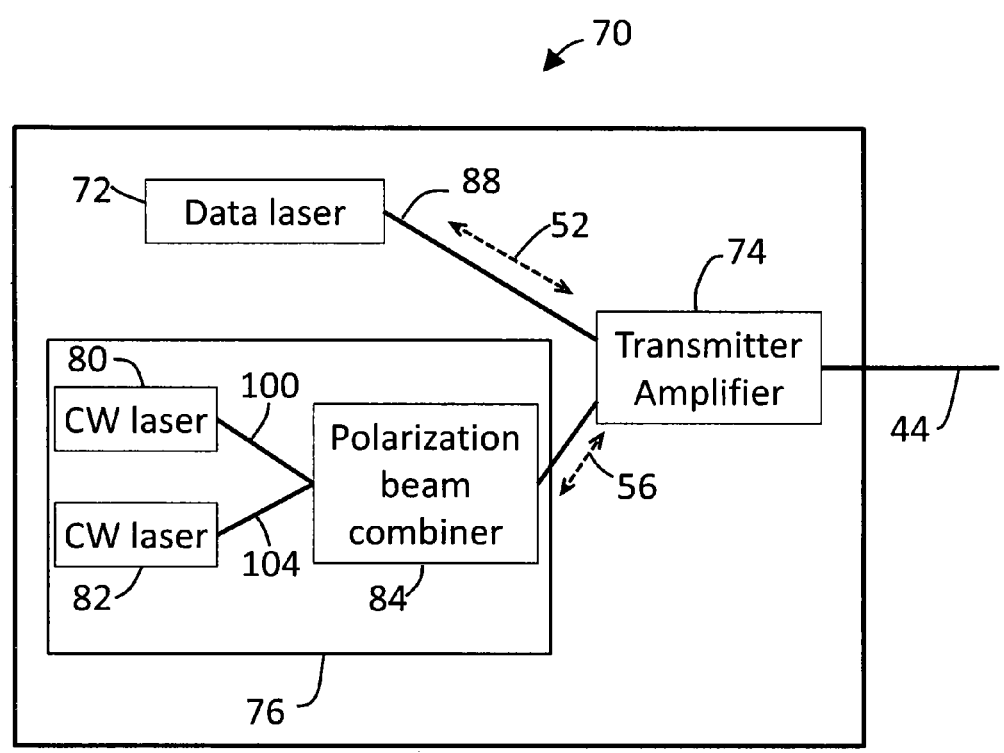
FIG. 2 is a block diagram of an exemplary subsea link idler apparatus in accordance with the present disclosure.

FIG. 2 is a block diagram of an exemplary subsea link idler apparatus 70 in accordance with the present disclosure. The subsea link idler apparatus 70 may include a data laser 72, a transmitter amplifier 74, and a dual polarization idler 76 having a first continuous wave laser 80, a second continuous wave laser 82, and a polarization beam combiner 84.

In one example, the subsea link idler apparatus 70 may be located within the terminal station 42 of the subsea communication system 40. However, it will be understood that the subsea link idler apparatus 70 may be located elsewhere. The components of the subsea link idler apparatus 70 may be implemented as separate devices, which may have their own power supply, local memory and one or more processor (referred to hereinafter as the "processor"), but may be installed within the same rack or installation of racks. In another example, the components can be implemented as a single device having a shared power supply, memory and processing equipment. Or, in another example, the components can be implemented in a modular manner in which one or more of the components share a power supply and/or housing.

The data laser 72 generates at least one first laser beam 88 to form at least one optical data carrier signal 52. The optical data carrier signal 52 may be used to transmit data in the optical data channel 54 in the optical fiber submarine cable 44. The first laser beam 88 has a first frequency and is guided or otherwise deviated to the transmitter amplifier 74. The first frequency may be tuned to be within 5% of a center channel frequency of a plurality of data channel frequencies. The center channel frequency is within a first data channel bandwidth slot 90. A channel bandwidth slot, also known as a frequency slot, is a range of frequency allocated to a given channel and unavailable to other channels. A channel bandwidth slot is a contiguous portion of the spectrum available for an optical passband filter. A particular channel bandwidth slot is defined by the channel bandwidth slot's nominal central frequency and slot width.

In one example, the nominal central frequencies are designated by a frequency grid. The frequency grid is a reference set of allowed nominal central frequencies (and corresponding wavelengths) of channels allowed in a particular communication system.

Frequency grids, channel bandwidth slots, and examples thereof are further defined in the International Telecommunications Union Recommendation ITU-T G.694.1, "Spectral grids for WDM applications: DWDM frequency grid". In one commonly used frequency grid, the frequency grid covers approximately 186 THz to 201 THz and is subdivided to provide 50 GHz and 25 GHz spaced grids.

The generation of laser beams for use as optical data carrier signals 52 is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

Figure 3A:
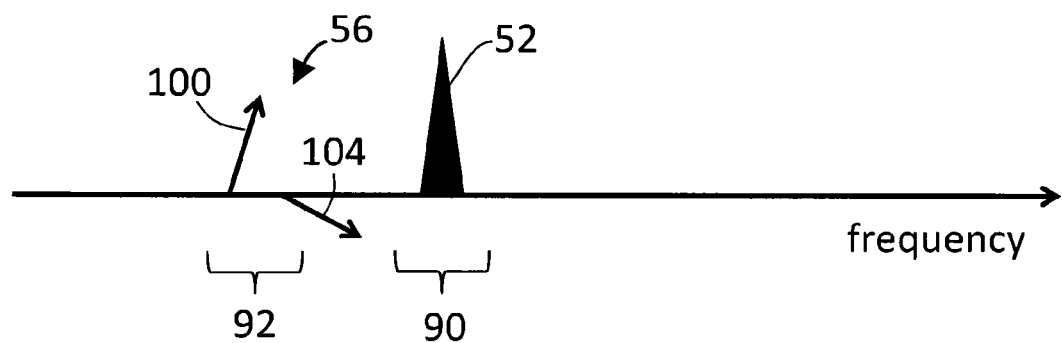
FIG. 3A is a graphical visualization of exemplary signals in accordance with the present disclosure.

FIG. 3A is a graphical visualization of exemplary signals in accordance with the present disclosure. An exemplary optical data carrier signal 52 is represented by a triangle along a frequency axis line. The optical data carrier signal 52 may be phase modulated and part of a multiplexed data signal as previously described. The optical data carrier signal 52 may be used to transmit data in the data channel 54. As illustrated in FIG. 3A, the exemplary data carrier signal 52 is within the first data channel bandwidth slot 90. FIG. 3A shows one data carrier signal 52 for explanatory purposes. It will be understood that multiple data carrier signals may be transmitted in one or more data channels 54.

Returning now to FIG. 2, the first continuous wave laser 80 of the dual polarization idler 76 is adapted to generate a second laser beam 100 with a second frequency and a first polarization. The second frequency is within a second data channel bandwidth slot 92.

The second continuous wave laser 82 of the dual polarization idler 76 is adapted to generate a third laser beam 104 with a third frequency and a second polarization. The second polarization is different from the first polarization. The first and second polarization together may be referred to as orthogonal polarization. In FIG. 3A, a signal from the second laser beam 100 and a signal from the third laser beam 104 are represented as a first and a second vector line, and polarization is represented by the vector lines' direction.

The third frequency is offset in frequency from the second frequency. The third frequency is within the same data channel bandwidth slot 92 as the second frequency. Therefore, the third frequency is separated from the second frequency by a frequency range smaller than the size of the second data channel bandwidth slot 92.

For example, the third frequency may be separated from the second frequency by a frequency range of five to twenty GHz. The third frequency may be separated from the second frequency by a frequency of five, six, seven, eight, nine, ten, eleven, twelve, thirteen, fourteen, fifteen, sixteen, seventeen, eighteen, nineteen and/or twenty GHz, or any frequency in between. The second and third frequencies may be offset far enough from one another to avoid penalties to the data channels caused by cross-polarization modulation (XPoIM). In one aspect of the present disclosure, the third frequency is separated from the second frequency by twelve GHz.

The third frequency may be offset from the second frequency, and/or the second frequency from the third frequency from any starting frequency within the bounds of a particular data channel bandwidth slot. In one particular aspect of the present disclosure, the second frequency may be offset from a particular central frequency of a frequency grid in one direction and the third frequency may be offset from the particular central frequency in the opposite direction. For example, the second frequency may be larger than the central frequency by six GHz, while the third frequency may be smaller than the central frequency by six GHz. In this example, there is a frequency range between the second and third frequency of twelve GHz. The second and third frequencies in this example are set such that the second and third frequencies are in a single data channel bandwidth slot, such as a single 50 GHz, 25 GHz, or smaller channel slot.

The first and second continuous wave lasers 80, 82 may be tunable, such that the second and third frequencies may be tuned to a desired separation from one another and/or offset from a pre-determined frequency grid. Or, the first and second continuous wave lasers 80, 82 may be pre-set to the desired separation in frequency, for example, by the manufacturer of the continuous wave lasers 80, 82.

As shown in FIG. 2, the polarization beam combiner 84 is used to receive and combine multiple orthogonal polarization lasers for output. The polarization beam combiner 84 receives and combines the second and third laser beams 100, 104, having first and second polarizations, into the idler signal 56. The idler signal 56 therefore has dual polarization.

The transmitter amplifier 74 receives and simultaneously transmits the data carrier signal 52 and idler signal 56. The data carrier signal 52 and the idler signal 56 may be simultaneously transmitted through the optical fiber submarine cable 44.

Corresponding to one aspect of the present invention, multiple idler signals 56 may be simultaneously generated for transmission. For example, as illustrated in FIGS. 3B, 4 and 5, the subsea link idler apparatus 70 may include a third continuous wave laser 110 to generate a fourth laser beam 112 with a fourth frequency and a third polarization, the third frequency being within a third data channel bandwidth slot 114; as well as a fourth continuous wave laser 116 to generate a fifth laser beam 118 with a fifth frequency and a fourth polarization different from the third polarization, the fifth frequency being offset in frequency from the fourth frequency and being within the third data channel bandwidth slot 114.

Figure 4:
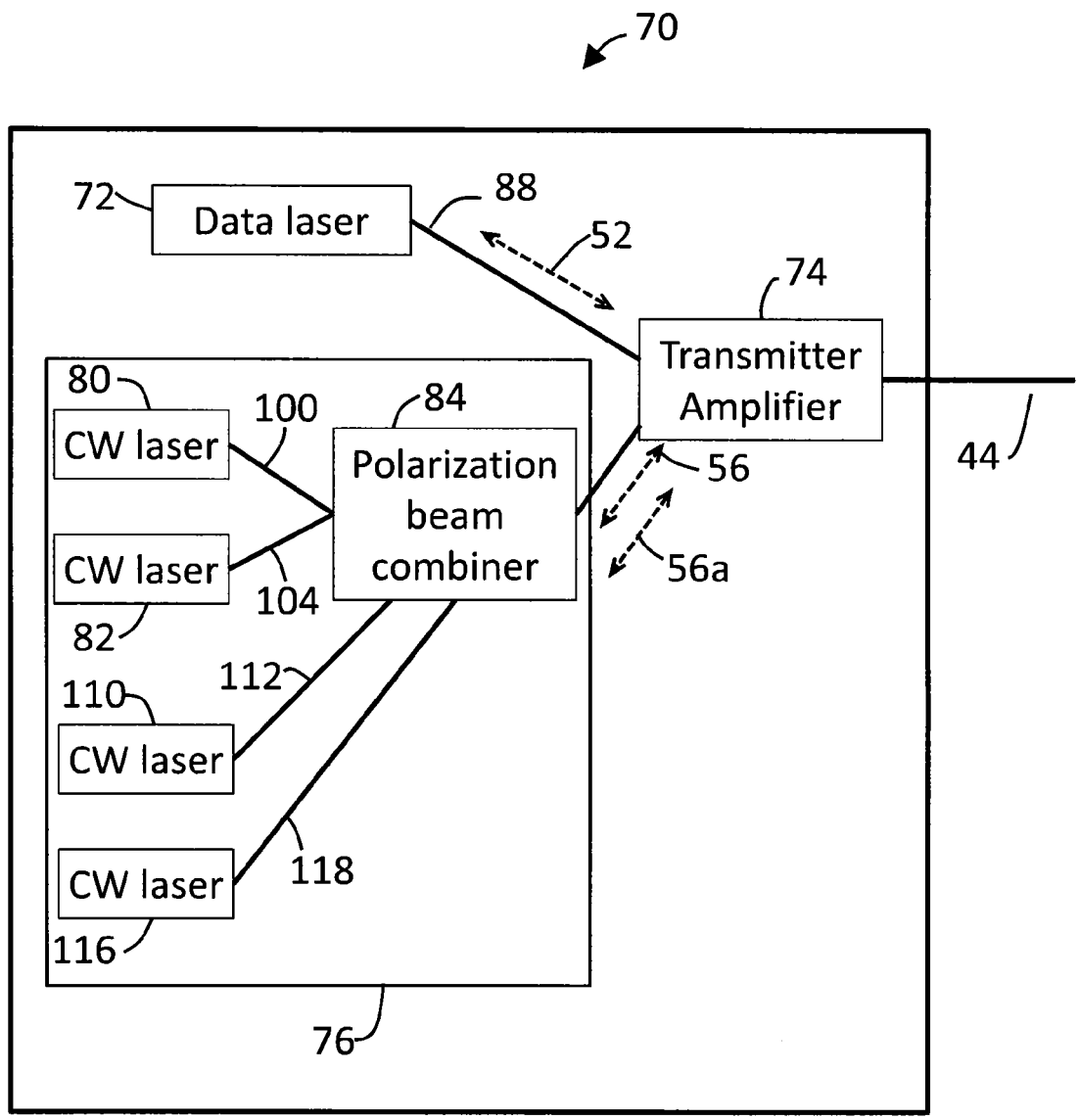
FIG. 4 is a block diagram of another exemplary subsea link idler apparatus in accordance with the present disclosure.
Figure 5:
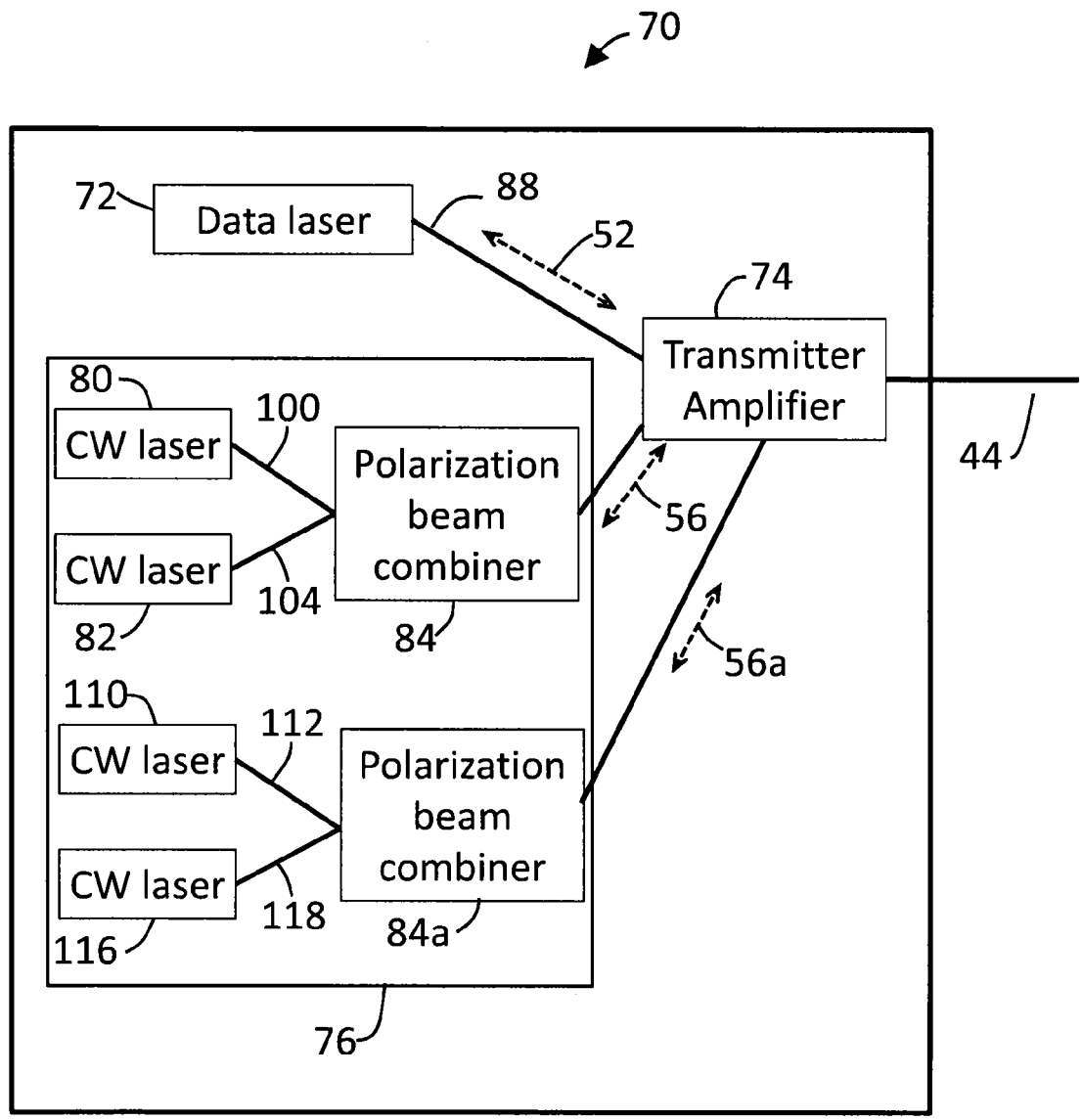
FIG. 5 is a block diagram of yet another exemplary subsea link idler apparatus in accordance with the present disclosure.

The polarization beam combiner 84 may be positioned in paths of the fourth and fifth laser beams 112, 118 and may receive and combine the fourth and fifth laser beams 112, 118 into a second idler signal 56a, as shown in FIG. 4. Additionally or alternatively, a second polarization combiner 84a may be positioned in paths of the fourth and fifth laser beams 112, 118 and may receive and combine the fourth and fifth laser beams 112, 118 into the second idler signal 56a, as shown in FIG. 5. It will be understood that any number of idler signals 56, 56a . . . 56n may be used in the subsea communication system 40.

Figure 3B:
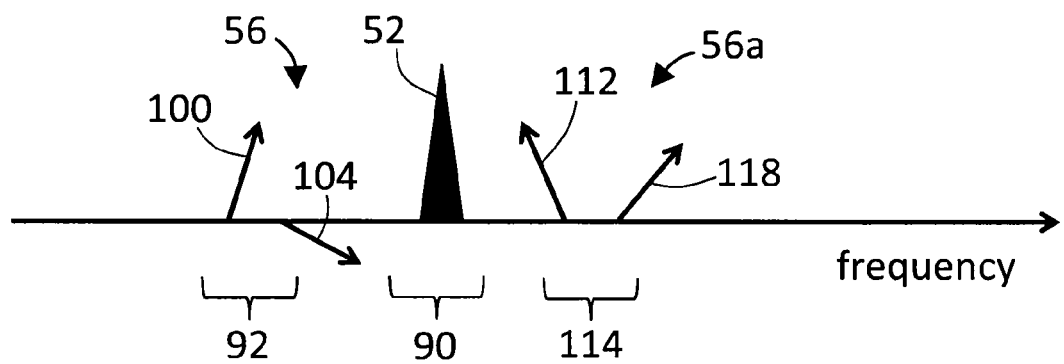
FIG. 3B is another graphical visualization of exemplary signals in accordance with the present disclosure

FIG. 3B is a graphical visualization of a plurality of exemplary signals in accordance with the present disclosure. When multiple idler signals 56, 56a . . . 56n are used, the first and second polarization of the first idler signal 56 can be different from the first and second polarization of the second idler signal 56a. Additionally, the frequency range between the first and second frequencies of the first idler signal 56 can be different from the frequency range between the second and third frequencies of the second idler signal 56a.

Figure 6:
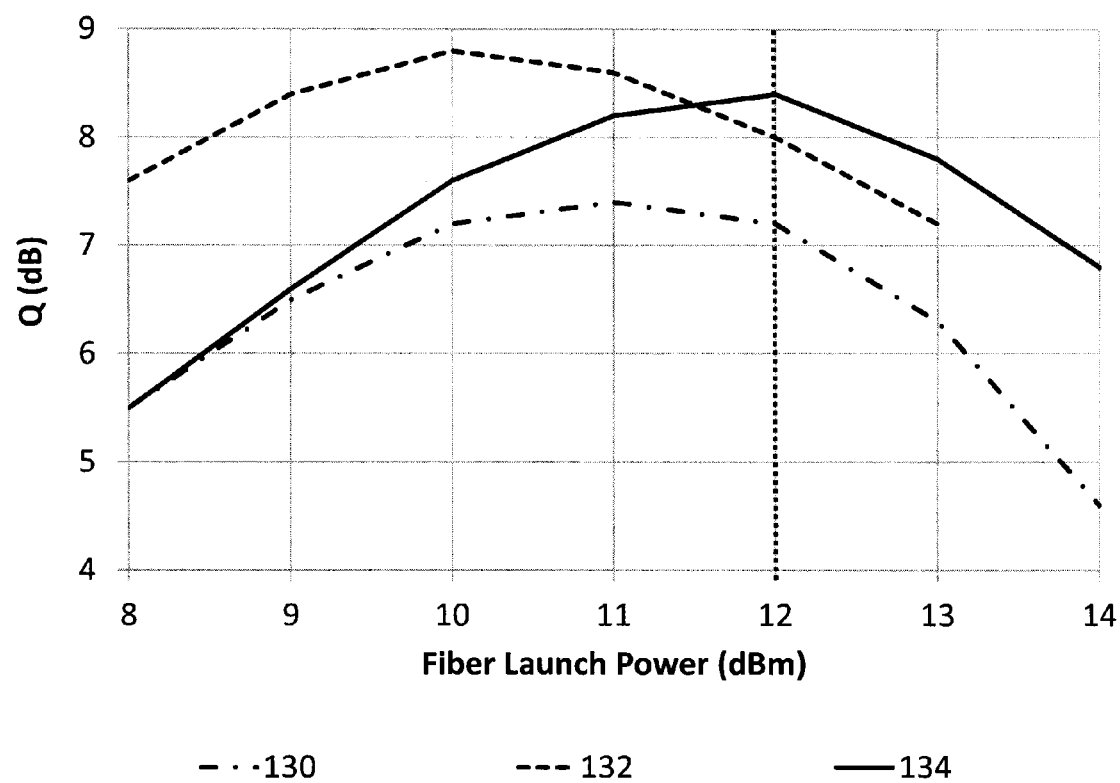
FIG. 6 is an exemplary graph of quality factor versus fiber launch power in accordance with the present disclosure.

FIG. 6 is a graphical example of Quality Factor versus Fiber Launch Power in accordance with the present disclosure. The use of dual polarization idler 76 improves the quality of data carrier signals 52 in the subsea communication system 40. In the subsea communication system 40, a measurement of quality of the received data carrier signal 52 may be referred to as "Q" or "Q factor" and may be measured in decibels (dB). It is desirable for the quality of the received data carrier signal 52 to be a high and stable value of Q for reliable and consistent signal receipt. Producing a high and stable value of Q may be addressed in part by reducing the penalties caused by idlers. In FIG. 6, results of Quality factor (Q) measurements in decibels (dB) for exemplary subsea communication systems are shown. In use, subsea communication systems may run at fiber launch power of eight to fourteen decibels milliwatt (dBm), and typically may run at eleven to thirteen dBm.

As can be seen in FIG. 6, in a prior art model subsea communication system without the dual polarization idler 76, under full loading conditions (as illustrated by line 130) and half-loading conditions (as illustrated by line 132) the Q factor decreases with fiber launch power after approximately ten dBm. Full loading conditions occur when all the channels are populated. Half loading conditions occur when half the channels are populated, such that each of the channels typically has twice the optical power versus a channel in a system with full loading conditions. The decrease in the Q factor after 10 dBm is caused by nonlinearities, such that it is desirable to run the communication system with fiber launch power at a level below 10 dBm, that is, in the more linear region to the left of the peaks in the Q factor of lines 130, 132 as illustrated in FIG. 6.

However, when the Q factor is measured for the subsea communication system 40 using the dual polarization idler 76 under half-loading conditions, the Q factor continues to increase to twelve dBm fiber launch power and remains above the Q factor levels for systems without the dual polarization idler 76 beyond twelve dBm fiber launch power, as illustrated by line 134. The constant optical power of subsea systems may be at 12 dBm in this case. Under half loading conditions, the dual polarization idler 76 causes the Q factor to be at the peak at 12 dBm, compared to the subsea system without the idler which is very nonlinear and leads to instabilities as shown in line 132.

Figure 7A:
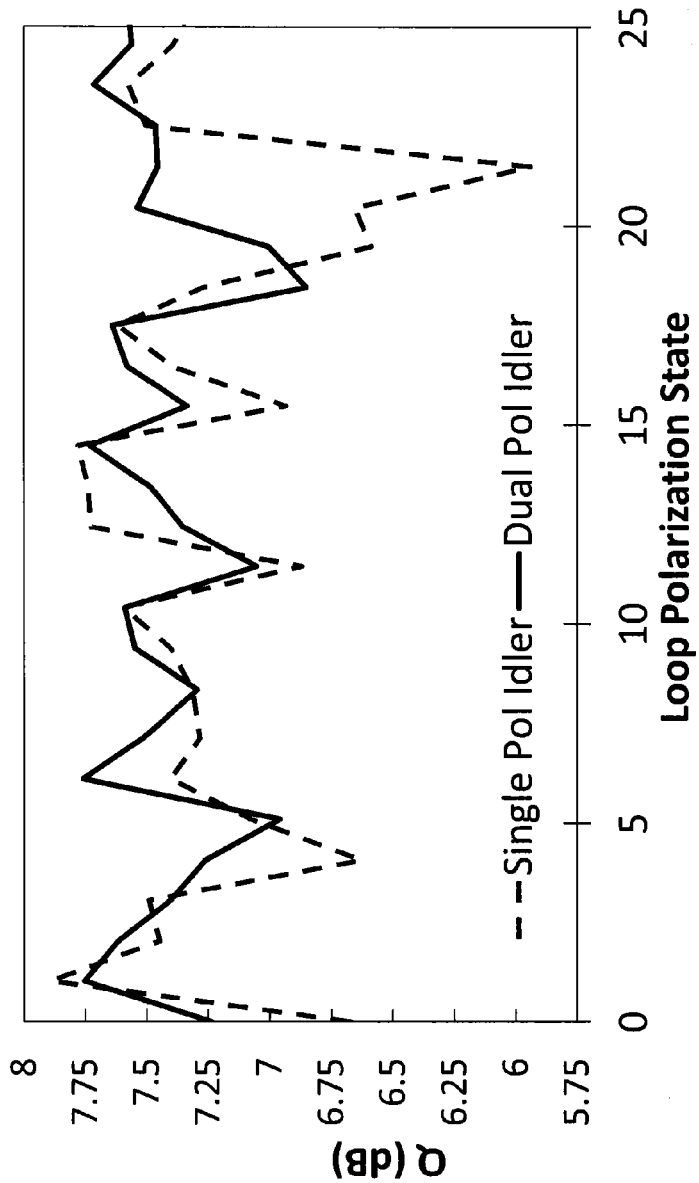
FIG. 7A is an exemplary graph of quality factor versus loop polarization state.
Figure 7C:
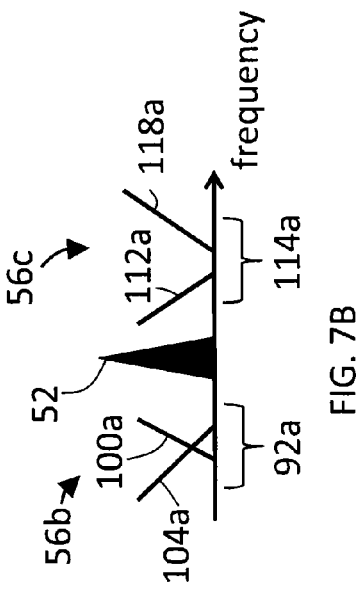
FIG. 7C is a graphical visualization of exemplary data and single polarization signals in accordance with the present disclosure.
Figure 7B:
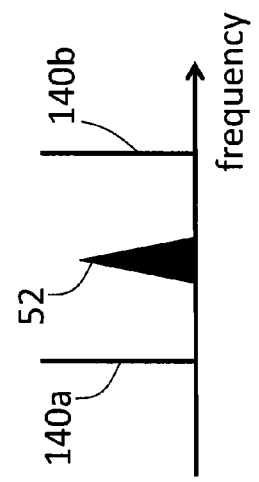
FIG. 7B is a graphical visualization of exemplary data and dual polarization signals in accordance with the present disclosure.

FIG. 7A is a graphical example of the results of exemplary tests measuring fluctuation and average performance across polarization states of subsea communication system models. In the exemplary tests, a first model of a first subsea communication system 40 was created using two dual polarization idlers 76 producing idler signals 56b, 56c, similar to that described in conjunction with FIGS. 3B, 4, and 5. The frequencies of the idler signals 56b, 56c were set to frequencies on either side of the frequency of a test data carrier signal 52, as is graphically represented in FIG. 7B.

The dual polarization idlers 76 were arranged in accordance with the present disclosure with the frequency separating the first continuous wave laser's laser beam 100a and the second continuous wave laser's laser beam 104a that was less than the width of the channel bandwidth slot 92a, such that the idler signal 56b is within the channel bandwidth slot 92a. Likewise, the frequency range separating the third continuous wave laser's laser beam 112a and the fourth continuous wave laser's laser beam 118a was less than the width of the channel bandwidth slot 114a, such that the idler signal 56c is within the channel bandwidth slot 114a.

Additionally, a second model of a subsea communication system was created using two single polarization idlers. Each of the single polarization idlers had a single polarization idler signal 140a, 140b. As is graphically represented in FIG. 7C, one of the single polarization idler signals 140a had a frequency on one side of the frequency of the test data carrier signal 52 and the other single polarization idler signal 140b had a frequency on the other side of the frequency of the test data carrier signal 52.

Quality factor (Q) data was taken for both the first and second models at different polarization states, as shown graphically in FIG. 7A. As can be seen in FIG. 7A, use of dual polarization idlers 76 reduces fluctuation of Q and improves Q levels in the subsea communication system 40 over use of single polarization idlers.

Figure 8A:
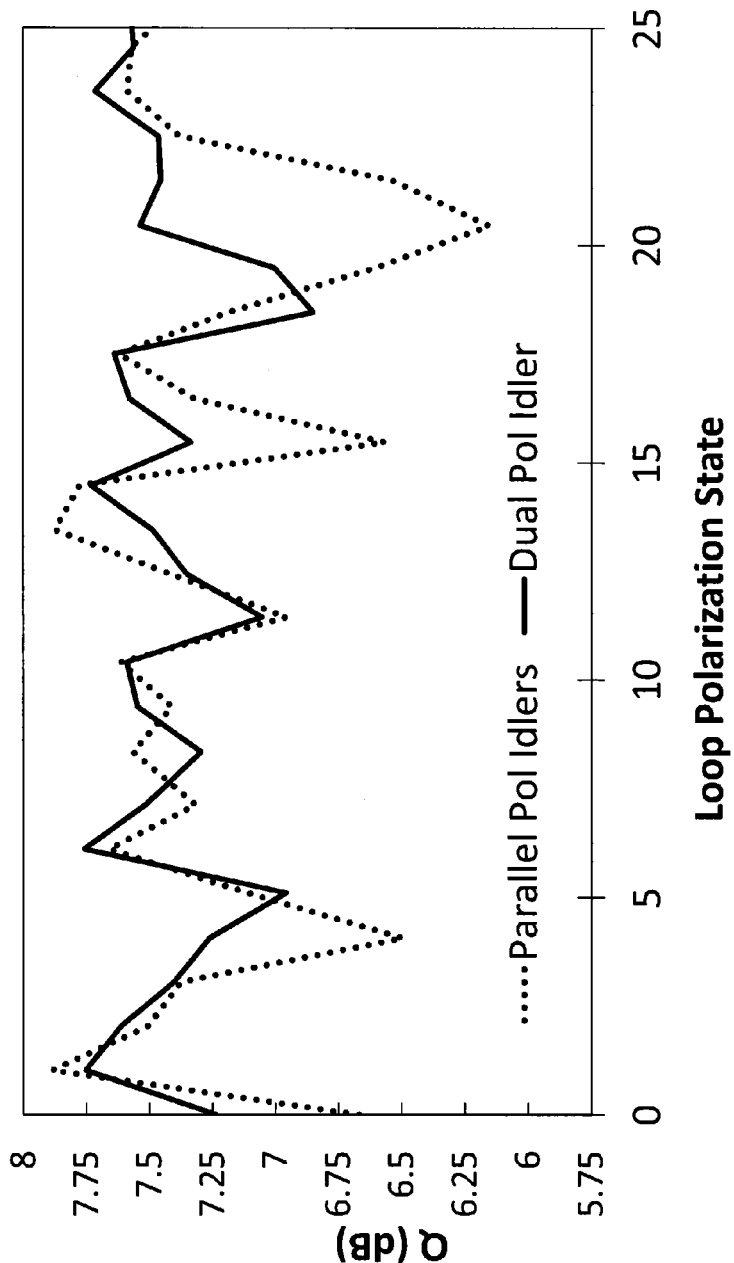
FIG. 8A is another exemplary graph of quality factor versus loop polarization state.
Figure 8B:
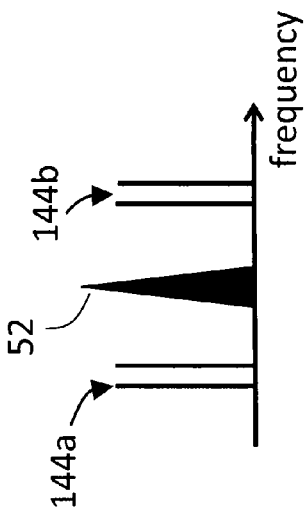
FIG. 8B is a graphical visualization of exemplary data and multiple single polarization signals in accordance with the present disclosure

FIG. 8A is a graphical example of the results of more exemplary tests measuring fluctuation and average performance across polarization states of subsea communication system models. In the exemplary tests, a third model of a subsea communication system was created using multiple single polarization idler signals 144a, 144b. The single polarization idler signals 144a, 144b had frequencies on either side of the frequency of the test data carrier signal 52—as is graphically represented in FIG. 8B. Quality factor (Q) data is shown charted in FIG. 8A from the first and third subsea communication systems models at different polarization states. As can be seen in FIG. 8A, use of dual polarization idlers 76 reduces fluctuation of Q and improves Q levels in the subsea communication system 40 over use of multiple single polarization idlers.

Figure 9:
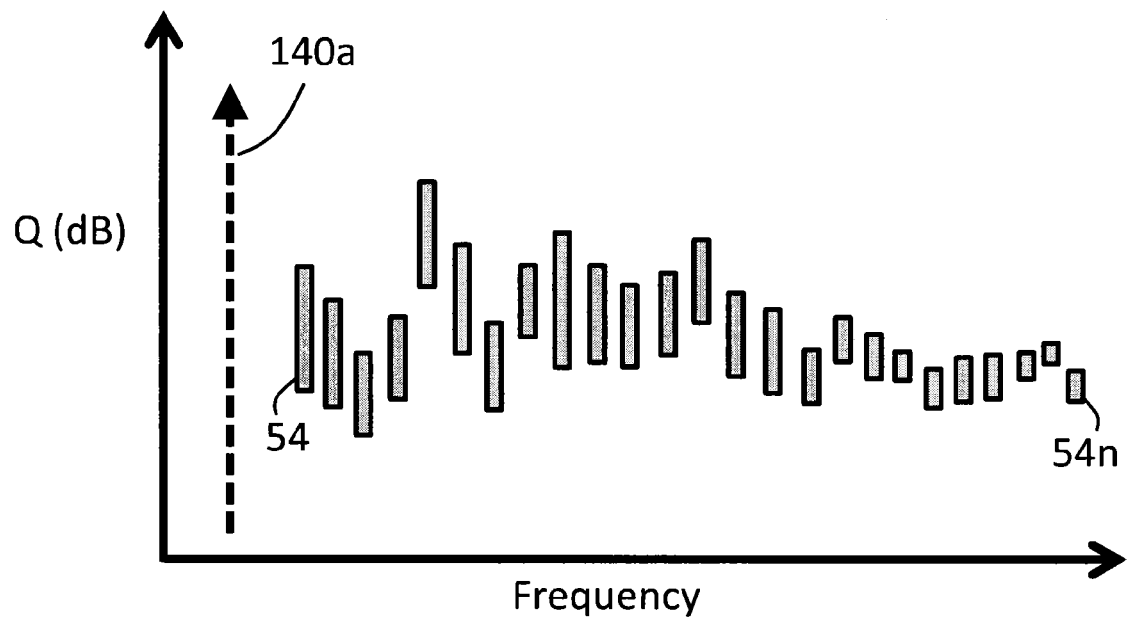
FIG. 9 is a graphical sketch of the results of exemplary tests of a subsea system using a single polarization idler.

FIG. 9 is a graphical sketch of the results of exemplary tests of a model of a subsea communication system using a single polarization idler. The graph illustrates Q factor versus frequency for the exemplary single polarization idler system. Each graphical box represents changes in Q of a data channel 54, 54a . . . 54n over a set time period. The broken line arrow represents the single polarization idler signal 140a. As can be seen from the graph, the closer the frequency of the data channels is to the frequency of the single polarization idler signal 140a, the more variation and the lower the value of Q. The Q variation and degradation is caused by interference between the single idler polarization and the data channels 54, 54a . . . 54n, as previously explained.

Figure 10:
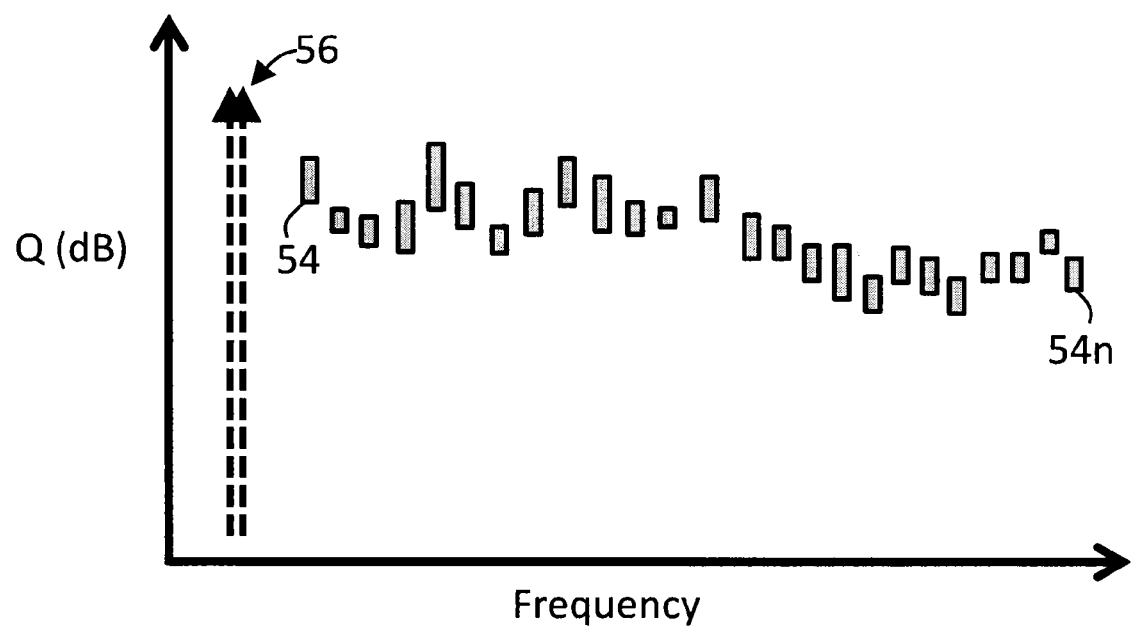
FIG. 10 is a graphical sketch of the results of exemplary tests of a subsea system using a dual polarization idler.

FIG. 10 is a graphical sketch of the results of exemplary tests of a model of the subsea communication system 40 using the dual polarization idler 76 described above. The graph illustrates Q factor versus frequency for the exemplary dual polarization idler subsea communication system 40. Again, each graphical box represents changes in Q of a data channel 54, 54a . . . 54n over a set time period. The two broken line arrows represent idler signal 56 from the dual polarization idler 76. As can be seen from the graph, in comparison to the single polarization idler system of FIG. 9, the variation of Q is greatly reduced and the value of Q is increased in the data channels 54, 54a . . . 54n.

CONCLUSION

Conventionally, subsea communication systems 40 use ASE idlers and/or single polarization CW idlers to soak up power. However, conventional idlers cause interference with data carrier signals 52 and diminish quality and reliability. In accordance with the present disclosure, methods and apparatuses are disclosed that enhance the quality of data carrier signals 52 by use of one or more dual polarization idler 76.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure. Though the present disclosure is explained in terms of lasers and coherent light systems, any suitable light emitting device may be used.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment.

REFERENCES

The following references are hereby incorporated herein by reference:

RFC 3473 "Generalized Multi-Protocol Label Switching (GMPLS) Signaling Resource ReserVation Protocol-Traffic Engineering (RSVP-TE) Extensions," Berger (Ed.), The Internet Society, January 2003.

RFC 3945, Mannie, E., "Generalized Multi-Protocol Label Switching (GMPLS) Architecture", October 2004.

G.694.1 ITU-T, "Spectral grids for WDM applications: DWDM frequency grid", February 2012.

G.709 ITU-T, "Interfaces for the Optical Transport Network (OTN)", G.709 Recommendation, February 2012.

G.798.1 ITU-T, "Types and characteristics of optical transport network equipment", G.798.1 Recommendation, January 2013.

G.872 ITU-T, "Architecture of optical transport networks", October 2012.

G.971 ITU-T, "General features of optical fibre submarine cable systems." G.971 Recommendation, July 2010.

G.972 ITU-T, "Definition of terms relevant to optical fibre submarine cable systems." G.972 Recommendation, September 2011.

G.973 ITU-T, "Repeaterless submarine systems." G.973 Recommendation, July 2010.

G.974 ITU-T, "Regenerative submarine systems." G.974 Recommendation, December 2007.

G.977 ITU-T, "Optically amplified submarine systems." G.977 Recommendation, April 2011.

What is claimed is:

1. A subsea link idler apparatus comprising:
at least one data laser generating at least one first laser beam as a data signal, the first laser beam having a first frequency being within a first data channel bandwidth slot;
a first continuous wave laser generating a second laser beam with a second frequency and a first polarization, the second frequency being within a second data channel bandwidth slot;
a second continuous wave laser generating a third laser beam with a third frequency and a second polarization different from the first polarization, the third frequency being offset in frequency from the second frequency and being within the second data channel bandwidth slot;

a polarization beam combiner positioned in paths of the second and third laser beams combining the second and third laser beams into an idler signal; and a transmitter amplifier receiving and transmitting the data and idler signals.

2. The apparatus of claim 1, wherein the third frequency is separated from the second frequency by a frequency in a range of five to twenty GHz.

3. The apparatus of claim 1, wherein the third frequency is separated from the second frequency by a frequency of twelve GHz.

4. The apparatus of claim 1, wherein the first frequency is tuned to a center channel frequency of a plurality of data channel frequencies.

5. The apparatus of claim 4, wherein the center channel frequency is a first center channel frequency and the second data channel bandwidth slot has a second center channel frequency, and the second frequency is offset and greater than the second center channel frequency and the third frequency is offset and less than the second center data channel frequency.

6. The apparatus of claim 4, wherein the center channel frequency of the plurality of data channel frequencies is in accordance with requirements conforming to an ITU-T prescribed frequency grid.

7. The apparatus of claim 1, wherein the idler signal is a first idler signal, and the apparatus further comprises:
a third continuous wave laser generating a fourth laser beam with a fourth frequency and a third polarization, the fourth frequency being within a third data channel bandwidth slot; and
a fourth continuous wave laser generating a fifth laser beam with a fifth frequency and a fourth polarization different from the third polarization, the fifth frequency being offset in frequency from the fourth frequency and being within the third data channel bandwidth slot;
wherein the polarization beam combiner is positioned in paths of the fourth laser beam and the fifth laser beam and adapted to combine the fourth and fifth laser beams into a second idler signal.

8. The apparatus of claim 1, wherein the idler signal is a first idler signal, wherein the polarization beam combiner is a first polarization beam combiner, and wherein the apparatus further comprises:
a third continuous wave laser generating a fourth laser beam with a fourth frequency and a third polarization, the fourth frequency being within a third data channel bandwidth slot;
a fourth continuous wave laser generating a fifth laser beam with a fifth frequency and a fourth polarization different from the third polarization, the fifth frequency being offset in frequency from the fourth frequency and being within the third data channel bandwidth slot; and
a second polarization beam combiner positioned in paths of the fourth laser beam and the fifth laser beam and adapted to combine the fourth and fifth laser beams into a second idler signal.

9. The apparatus of claim 1, wherein the first and second continuous wave lasers are tunable in frequency.

10. The apparatus of claim 1, wherein the first and second continuous wave lasers are pre-set in frequency.

11. A method, comprising:
generating with a data laser a first laser beam as a data signal, the first laser beam having a first frequency within a first data channel bandwidth slot;
generating with a first continuous wave laser a second laser beam with a second frequency and a first polarization, the second frequency being within a second data channel bandwidth slot;
generating with a second continuous wave laser a third laser beam with a third frequency and a second polarization different from the first polarization, the third frequency being offset in frequency from the second frequency and being within the second data channel bandwidth slot;
combining with a polarization beam combiner, positioned in paths of the second and third laser beams, the second and third laser beams into an idler signal; and
receiving and transmitting with a transmitter amplifier the data and idler signals.

12. The method of claim 11, wherein the third frequency is separated from the second frequency by a frequency in a range of five to twenty GHz.

13. The method of claim 11, wherein the third frequency is separated from the second frequency by a frequency of twelve GHz.

14. The method of claim 11, wherein the first frequency is tuned to a center channel frequency of a plurality of data channel frequencies.

15. The method of claim 14, wherein the center channel frequency is a first center channel frequency and the second data channel bandwidth slot has a second center channel frequency, and the second frequency is offset and greater than the second center channel frequency and the third frequency is offset and less than the second center data channel frequency.

16. The method of claim 14, wherein the center channel frequency of the plurality of data channel frequencies is in accordance with requirements conforming to an ITU-T prescribed frequency grid.

17. The method of claim 11, wherein the idler signal is a first idler signal, and the method further comprises:
generating with a third continuous wave laser a fourth laser beam with a fourth frequency and a third polarization, the fourth frequency being within a third data channel bandwidth slot; and
generating with a fourth continuous wave laser a fifth laser beam with a fifth frequency and a fourth polarization different from the third polarization, the fifth frequency being offset in frequency from the fourth frequency and being within the third data channel bandwidth slot;
wherein the polarization beam combiner, positioned in paths of the fourth and fifth laser beams, combines the fourth and fifth laser beams into a second idler signal.

18. The method of claim 11, wherein the idler signal is a first idler signal, and the polarization beam combiner is a first polarization beam combiner, and the method further comprises:
generating with a third continuous wave laser a fourth laser beam with a fourth frequency and a third polarization, the fourth frequency being within a third data channel bandwidth slot;
generating with a fourth continuous wave laser a fifth laser beam with a fifth frequency and a fourth polarization different from the third polarization, the fifth frequency being offset in frequency from the fourth frequency and being within the third data channel bandwidth slot; and
combining with a second polarization beam combiner, positioned in paths of the fourth and fifth laser beams, the fourth and fifth laser beams into a second idler signal.

19. The method of claim 11, wherein the first and second continuous wave lasers are tunable in frequency.

20. The method of claim 11, wherein the first and second continuous wave lasers are pre-set in frequency.

* * * * *